US007818860B2

(12) United States Patent
Hume et al.

(10) Patent No.: US 7,818,860 B2
(45) Date of Patent: Oct. 26, 2010

(54) BUSHING REMOVAL AND INSERTION TOOL & METHODS OF USE

(75) Inventors: Timothy Hume, Orange, CA (US); Aaron Schley, Orange, CA (US)

(73) Assignee: Schley Products, Inc., Anaheim, CA (US)

( * ) Notice: Subject to any disclaimer, the term of this patent is extended or adjusted under 35 U.S.C. 154(b) by 1122 days.

(21) Appl. No.: 11/445,479

(22) Filed: Jun. 1, 2006

(65) Prior Publication Data

US 2006/0277738 A1 Dec. 14, 2006

Related U.S. Application Data

(60) Provisional application No. 60/686,445, filed on Jun. 2, 2005.

(51) Int. Cl.
*B23P 19/00* (2006.01)
*B23P 19/04* (2006.01)

(52) U.S. Cl. .......................... 29/259; 29/426.5; 29/256; 29/258; 29/263; 29/280; 29/282; 29/898.07

(58) Field of Classification Search ................... 29/244, 29/256, 258, 259, 263, 264, 280, 282, 426.5, 29/426.1, 898.07, 428, 235
See application file for complete search history.

(56) References Cited

U.S. PATENT DOCUMENTS 1,069,539 A * 8/1913 Evans, Jr. .................... 29/235
2,444,112 A * 6/1948 Peglow ........................ 254/100
3,087,236 A * 4/1963 Paytas .......................... 29/244
3,299,497 A * 1/1967 Chmielewski ............... 29/258
3,467,811 A * 9/1969 Consoletti ................... 219/227
4,059,883 A * 11/1977 Osborne ...................... 29/259
4,476,617 A * 10/1984 Kobylarz ..................... 29/264
4,507,838 A * 4/1985 Hacker ......................... 29/263
5,224,917 A * 7/1993 Kilsdonk ..................... 29/764
6,266,859 B1 * 7/2001 Hernandez ................... 29/256
7,213,317 B2 * 5/2007 Hu .............................. 29/261
7,520,041 B1 * 4/2009 Aguilar ....................... 29/259
7,669,306 B2 * 3/2010 Palka .......................... 29/261
7,685,688 B2 * 3/2010 Fan ............................. 29/259
2006/0137160 A1 * 6/2006 Chung et al. .................. 29/259

* cited by examiner

*Primary Examiner*—Essama Omgba
(74) *Attorney, Agent, or Firm*—John J. Connors; Connors & Assoc. pc

(57) ABSTRACT

A tool removes from, or inserts into, an arm of a wheel mounting for an automotive vehicle a bushing. The tool includes a press member configured to grip the arm while overlying the location in the arm for the bushing. A screw element passes through a portion of the press member and engages a pressing cup with an outer rim that abuts an end of the bushing as the screw is manually rotated. The press member, screw element, and pressing cup upon being aligned and assembled with the press member gripping the arm and the rim of the pressing cup bearing against the end of the bushing, the screw element is rotated to apply a force to the end of the bushing as the screw element advances in the direction of the arm.

10 Claims, 5 Drawing Sheets

Installing

Removing

BUSHING REMOVAL AND INSERTION TOOL & METHODS OF USE

RELATED APPLICATION AND INCORPORATION BY REFERENCE

This utility application claims the benefit under 35 USC 119(e) of U.S. provisional patent application Ser. No. 60/686,445, entitled "Honda & Acura Trailing Arm Bushing Removal & Installation Tool and Method," filed Jun. 2, 2005. This related application is incorporated herein by reference and made a part of this application. If any conflict arises between the disclosure of the invention in this utility application and that in the related provisional application, the disclosure in this utility application shall govern. Moreover, the inventors incorporate herein by reference all U.S. patents, U.S. patent applications, and other documents, hard copy or electronic, cited or referred to in this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The word "cable" includes rope, wire, cord, thread, string, line, or any other equivalent flexible connecting member.

BACKGROUND OF THE INVENTION

Some automotive vehicle use a rubber bushing installed in a suspension arm of a wheel mounting. Typically, such bushings are carried in the rear-trailing arm suspension systems of Honda and Acura vehicles. The bushing cushions the axle of these vehicles and creates a comfortable ride. As time goes by the rubber bushing wears at friction points, such as control arm pivots, due to the "play" associated with broad tolerances. Moreover, the rubber deteriorates from road contaminants; perishes in the cold, and splits in the heat, impairing the automobile's handling and safety. Consequently, the rubber bushing in the wheel mounting arm periodically needs to be removed and replaced by a new bushing.

For Honda and Acura vehicles, the factory removal and replacement manual stipulates 1.8 hours to remove and replace one rear-trailing arm bushing in the Honda Civic, CRX, CRV, Del Sol, and Acura Integra models. These models have a bushing that is pressed in place at the front side of the rear-trailing arm. Excess noise coming from the rear-trailing arm indicates removal and replacement is required. The factory method of bushing removal and replacement is very involved and time consuming, it requires detaching the brake lines, emergency brake cables, the brake caliper, and the rear-trailing arm assembly from the vehicle, along with the use of a hydraulic press.

The factory recommends first to remove the brake lines, emergency brake cables, and brake caliper from the rear-trailing arm assembly so the assembly can be detached from the underbody of the vehicle, taking care not to drop the detached assembly in the process. The detached assembly is positioned on the hydraulic press with a receiver cup and a press cup positioned on opposed sides of the bushing and aligned with the hydraulic press piston. The hydraulic press is then activated to force the hydraulic press' piston onto the press cup, which forces the bushing from its cavity in the assembly and into the receiver cup, removing the bushing from the assembly. Then a new bushing is forced into the cavity. The assembly is positioned on the receiver cup, which is sitting on the hydraulic press' anvil. The new bushing is aligned with the cavity and the pressing cup is located over the top end of the bushing. With the pressing cup, new bushing, rear-trailing arm assembly, and receiver cup aligned and over the hydraulic press' anvil, the hydraulic press is actuated to advance the press' piston to bear against the pressing cup which presses the new bushing into the cavity in the trailing arm.

SUMMARY OF INVENTION

This invention has one or more features as discussed subsequently herein. After reading the following section entitled "DETAILED DESCRIPTION OF ONE EMBODIMENT OF THIS INVENTION," one will understand how the features of this invention provide its benefits. These benefits include, but are not limited to: (1) providing a simple to manufacture, inexpensive tool for removing and inserting a bushing in a wheel mounting suspension arm, without detaching the arm from the vehicle, thereby saving the professional service technician time by avoiding removal of the brake components and trailing arm assembly from the vehicle or from using a hydraulic press to accomplish removal and replacement of the bushing, (2) providing a tool that is easy to use, having a low profile insertion capability to maintain stability when removing and replacing the bushing, and (3) removing a worn Honda or Acura bushing and replacing it with a new bushing in about twenty (20) minutes or less instead of 1.8 hours, as stipulated in the factory repair manual.

Without limiting the scope of this invention as expressed by the claims that follow, some, but not necessarily all, of its features are:

One, the removal and insertion tool of this invention is especially designed to remove or insert a bushing in a wheel mounting arm for an automotive vehicle. The bushing has an end of a predetermined configuration, typically circular, that is exposed when positioned at a predetermined location in the arm, such as a cavity in the rear-trailing arm. The tool includes a press member adapted to grip the arm and a pressing cup having an outer rim with a configuration substantially identical to the circular open end of the bushing. A screw element extends through a portion of the press member to engage the pressing cup when using the removal and insertion tool.

Two, the press member, screw element, and pressing cup upon being assembled with the press member gripping the arm and the rim of the pressing cup bearing against the end (typically circular) of the bushing, the screw element is threaded through the hole and when turned engages the pressing cup, which then applies a force to the end of the bushing as the screw element advances in the direction of the arm.

When the bushing is already located in the arm, the outer rim of the pressing cup is positioned to bear against the end of the bushing and the press member grips the arm while overlying the pressing cup. The screw element is advanced to engage the cup. As it is manually rotated to push the bushing out of its cavity in the rear-trailing arm.

When the bushing is to be inserted into the cavity in the rear-trailing arm, the pressing cup and bushing are axially aligned with the cavity. The press member is positioned to grip the arm while overlying the axially aligned and assembled pressing cup and bushing and the screw element is aligned with the assembled pressing cup and bushing. The bushing is then pushed into the cavity as the screw element is manually rotated.

Three, the press member is configured to grip the rear-trailing arm so it is positioned to overlie the cavity in the arm that receives the bushing. The portion of the press member carrying the screw element includes a threaded hole therein that, when the press member is properly gripping the arm, the threaded hole overlies and is axially aligned with the cavity receiving the bushing. The screw element is threaded through this hole. The threaded hole may be offset with respect to a center point of the press member portion including this hole. The press member may have a substantially "U"-shaped configuration including a pair of legs straddling the portion thereof carrying the screw element. One arm of the pair of legs may be longer than the other arm of the pair.

Four, the pressing cup may have a closed end member opposed to the rim of the cup, and a substantially hollow, cylindrical sidewall portion extending outward from the closed end member of the cup to terminate in the rim. The rim is circular when the end of the bushing that the pressing cup engages is circularly configured. In one embodiment of this invention, the outside diameter of the cylindrical sidewall portion is substantially equal to an outside diameter of the circularly configured end of the bushing. The rim of the cup may include an inner lip that abuts an inside wall of the bearing upon the rim and end of the bushing engaging each other. The screw element may include a swivel tip adapted to engage the center of the closed end member of the cup as the screw element advances. There may be an indentation at the center of the closed end member that the swivel tip engages as the screw element advances.

Five, the tool may include a cable member with one end attached to the press member and another end adapted to be detachably connected to the bushing. Thus, when the bushing is removed from the opening in the arm, the cable limits the distance the bushing falls, avoiding injury or damage.

These features are not listed in any rank order nor is this list intended to be exhaustive.

This invention also includes a method of removing a bushing from a wheel mounting arm and a method of installing a bushing into a wheel mounting arm.

DESCRIPTION OF THE DRAWING

One embodiment of this invention, illustrating all its features, will now be discussed in detail. This embodiment depicts the novel and non-obvious bushing removal and insertion tool and method of this invention as shown in the accompanying drawing, which is for illustrative purposes only. This drawing includes the following figures (Figs.), with like numerals indicating like parts.

DETAILED DESCRIPTION OF ONE EMBODIMENT OF THIS INVENTION

Figure 2:
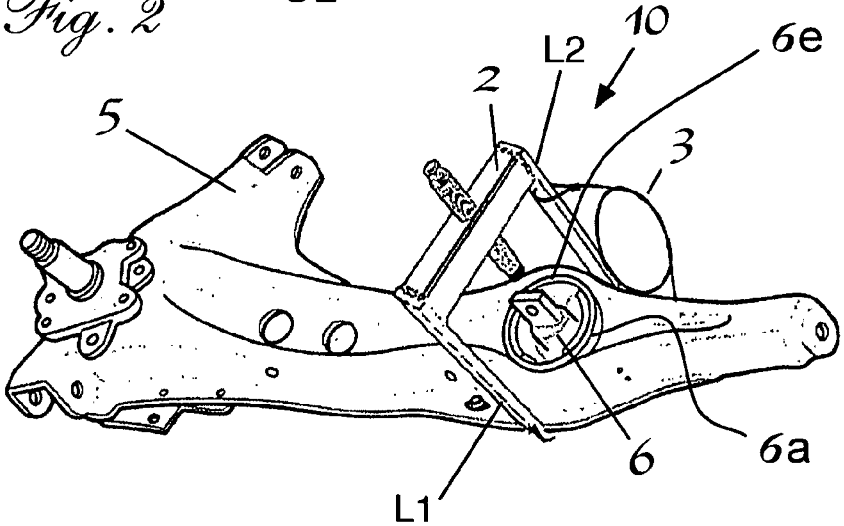
FIG. 2 is a perspective view of the press member of the tool shown in FIG. 1 gripping an arm of a wheel mounting.

One embodiment of the bushing removal and insertion tool of this invention is identified by the numeral 10. A typical bushing 6 (FIG. 2) has a generally cylindrical configuration and is lodged snugly into a cavity 7 (FIGS. 5A and 6B) in an arm 5 (FIG. 2) of a wheel mounting arm. The cavity 7 is open at both of its ends. As best shown in FIGS. 5A through 6B, Honda and Acura vehicles currently being sold, as well as older models, employ a bushing 6 comprising of a hollow, metallic, cylinder 6*a* packed with a rubbery material that forms a core 6*b* surrounding a center post 6*c* that projects outwardly from each end of the bushing 6. As shown in FIGS. 4, 5A, 5B, 6A, and 6B, there are apertures 6*d* in the outwardly projecting portions of the post 6*c*. As illustrated best in FIGS. 2 and 5A, one circular shaped end of the metallic cylinder 6*a* of the bushing 6 provides an annular edge 6*e* having a thickness of about ⅛ inch. This annular edge 6*e* is exposed when positioned in the cavity 7 as shown in FIGS. 2 and 6B.

The tool 10 includes a press member 2, a screw element 1, and a pressing cup 4. The press member 2 is configured to grip the arm 5, and it has a portion with a threaded hole H therein that overlies the cavity 7 when the press member 2 grips the arm 5. When removing or inserting a bushing 6 in the cavity 7 the screw element 1 is threaded clock wise through the hole H (FIG. 5A) and has a pointed swivel tip T that engages an indentation I on a closed end CE (FIG. 4A) of the pressing cup 4. The pressing cup 4 has an outer retaining rim R (FIG. 4A) with a configuration substantially identical to the end of the bushing 6, specifically the annular edge 6*e*, which in this embodiment is substantially circular.

Figure 3:
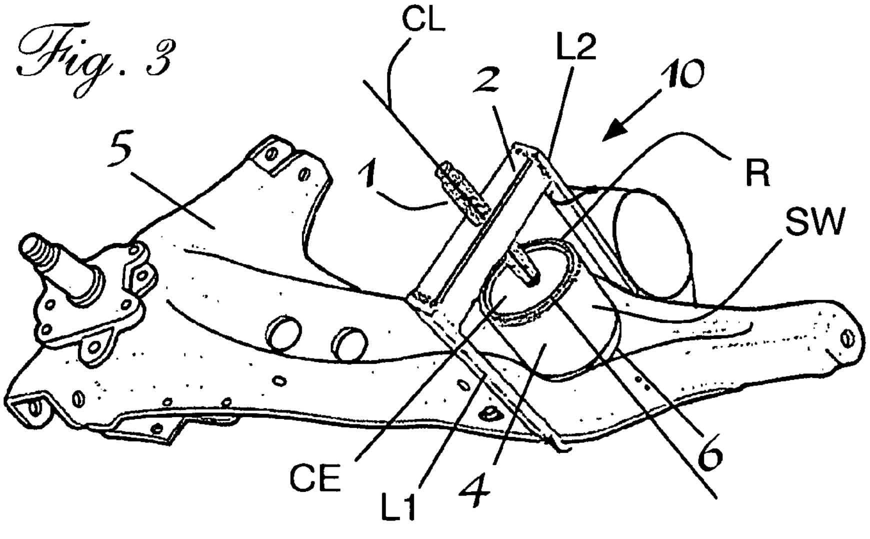
FIG. 3 is a perspective view of the pressing cup of the tool shown in FIG. 1 positioned over a bushing in the arm of the wheel mounting and a screw element of the press member engaging the pressing cup.
Figure 5A:
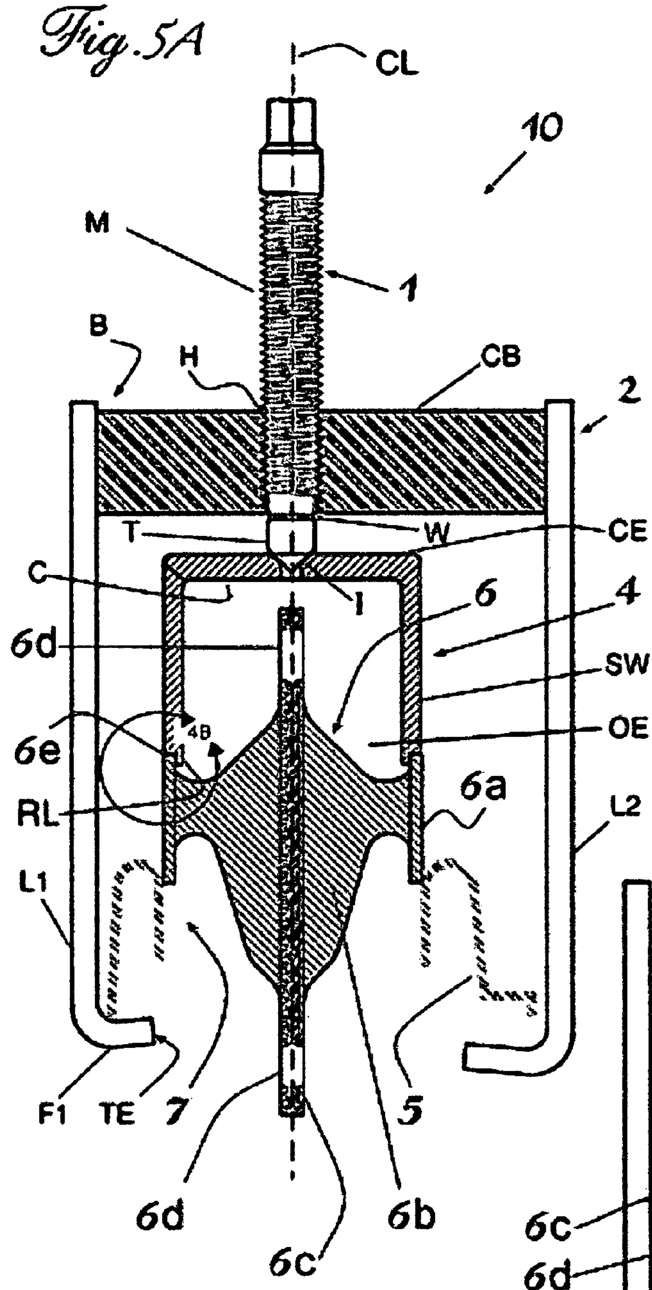
FIG. 5A is a cross-sectional view of the tool being used to insert a bushing into a cavity in the arm of the wheel mounting.

As depicted in FIGS. 3 and 5A, during use of the tool 10, the press member 2, screw element 1, and pressing cup 4 are aligned along a centerline CL and assembled with the press member gripping the arm 5 and the retaining rim R of the pressing cup 4 bearing against the annular edge 6*e* of the bushing 6. The screw element 1 is threaded clockwise through the hole H and engages the pressing cup 4. As the screw element 1 is manually rotated clockwise, as shown in FIGS. 3 and 5A, it applies a force to the end of the bushing 6, specifically to the annular edge 6*e*, as the screw element advances in the direction of the arm 5.

The screw element 1 is a conventional device such as, for example, a swivel screw made of hardened steel. As best shown in FIG. 5A, the screw element 1 has a main screw body M with an inserted swivel pointed tip T that fits into an opening in the main screw body M. The swivel pointed tip T is separated by a load-bearing washer W that sits between the swivel tip T and main screw body M. The load bearing washer W is designed to provide a gliding surface between the swivel tip T and main screw body M or when a force is applied by rotating the screw element 1 clockwise to engage the pressing cup 4 as shown in FIGS. 3 and 5A.

The tool 10 is specifically designed to remove and replace a bushing 6 in the Honda and Acura rear trailing, wheel mounting arm 5. As shown in FIG. 5A, the press member 2 is substantially "U" shaped and comprises a steel body B including a cross bar CB extending between a pair of substantially parallel, opposed legs L1 and L2, each having at a terminal end TE that is bent to provide an inwardly pointing finger element, F1 and F2, adapted to grip the wheel mounting arm 5. For a Honda and Acura rear trailing, wheel mounting arm 5, the threaded hole H is offset with respect to the center of the crossbar CB. Each leg L1 and L2 is a substantially flat plate element with an inner end welded to an outer end of the crossbar CB so each leg is substantially at a 90 degree angle with respect to the cross-bar CB.

The length of each leg L1 and L2, the leg's angle with respect to the cross-bar CB, the angle of the each finger F1 and F2 with respect to the leg that it is attached to, is adjusted so the press member 2 is properly located with respect to a cavity in a wheel mounting arm when the press member 2 is attached to the arm. This will vary depending on the individual dimensions and shape of the wheel mounting arm for which the tool 10 of this invention is designed to be used. In the embodiment illustrated, the leg L2 is longer than the leg L1. For example, with the tool 10 used with current, or older Honda and Acura models, the length of the leg L1 is 7.734 inches, the angle of the finger F1 is 15 degrees with respect to the leg and its length is 0.70 inch, and the length of the leg L2 is 7.873 inches, the angle of the finger F2 is 15 degrees with respect to the leg and its length is 1 inch.

Figure 1:
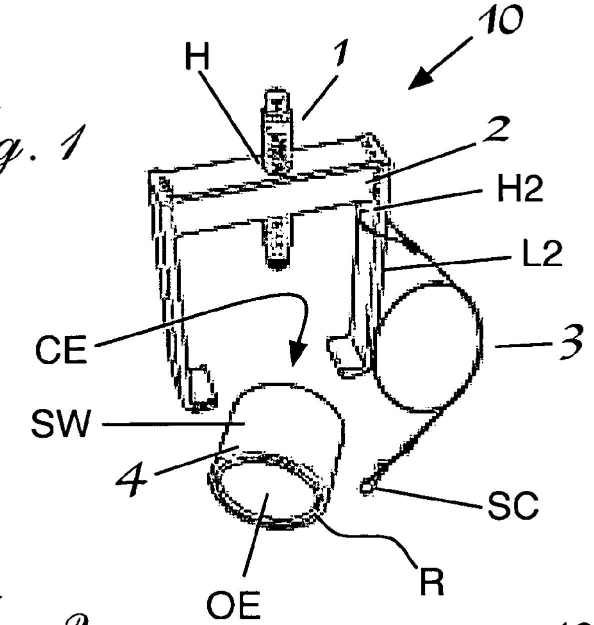
FIG. 1 is a perspective view of one embodiment of the bushing removal and insertion tool of this invention.
Figure 4:
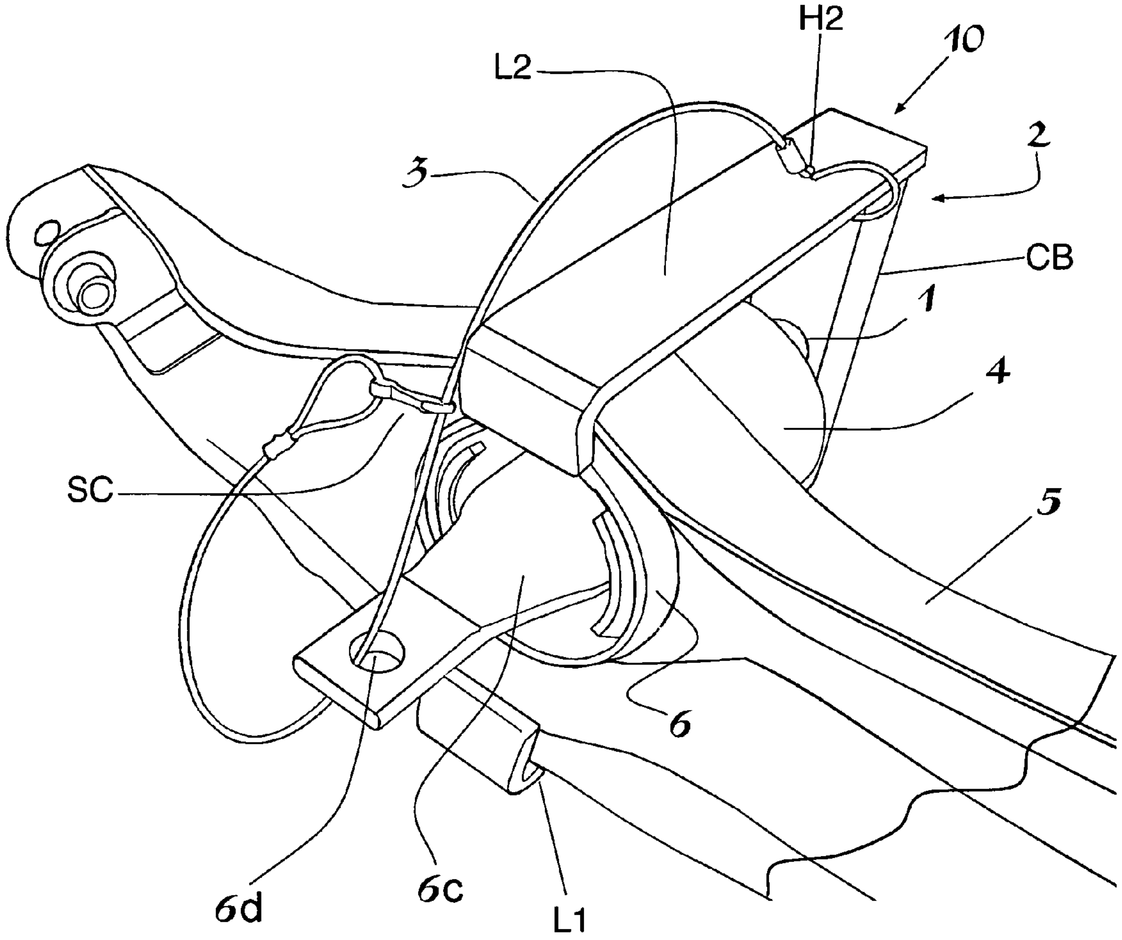
FIG. 4 is a perspective view of the backside of the arm of the wheel mounting showing a cable on the tool attached to the bushing.
Figure 4A:
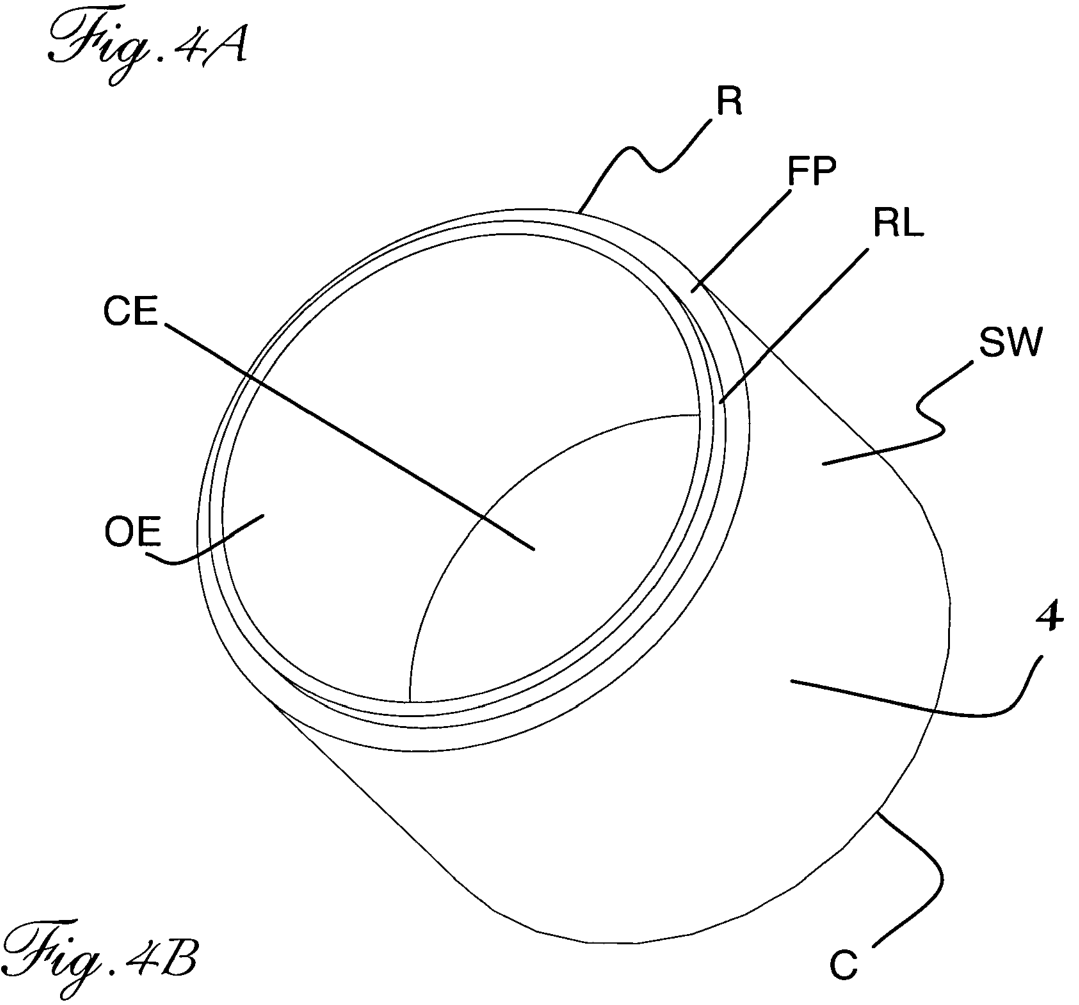
FIG. 4A is a perspective view of the pressing cup component of the tool of this invention.
Figure 4B:
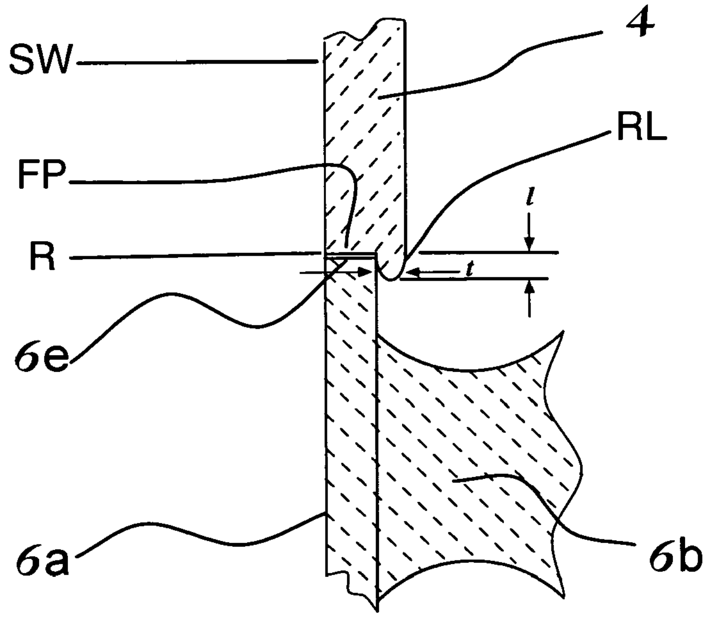
FIG. 4B is an enlarged view taken along line 4B of FIG. 5A showing the pressing cup retaining lip engaging the bushing.
Figure 6A:
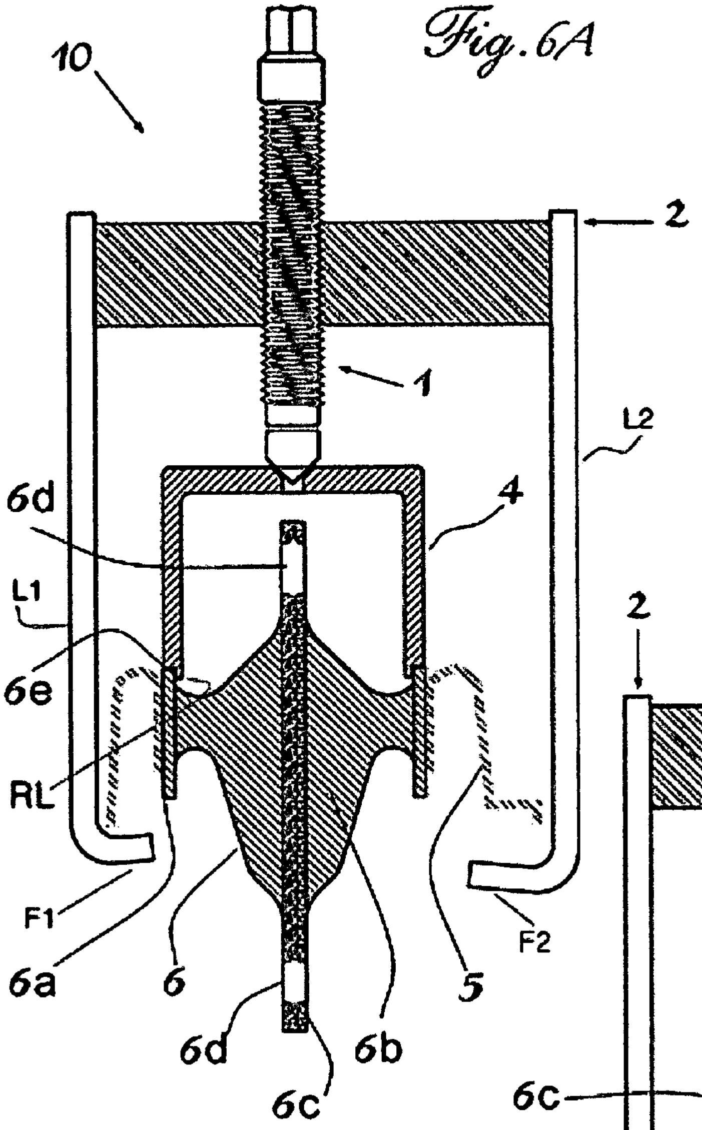
FIG. 6A is a cross-sectional view of the tool being used to remove a bushing from a cavity in the arm of the wheel mounting.
Figure 6B:
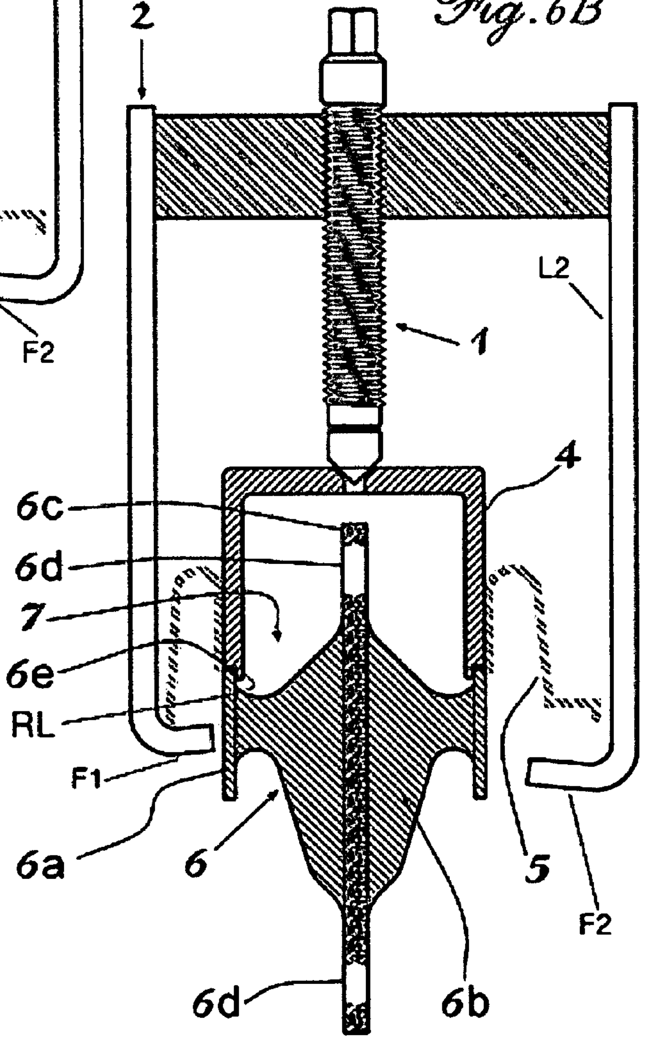
FIG. 6B is a cross-sectional view of the tool shown in FIG. 6A after its screw element has been rotated to push the bushing from the cavity in the arm of the wheel mounting.

As best illustrated in FIGS. 1 and 4A, the pressing cup 4 includes a cylindrical sidewall SW with a closed end CE and an opposed open end OE providing a rim R. A cap C is welded to the sidewall SW to form the closed end CE. As best shown in FIG. 5A, this cap C has on its exterior surface the centrally located indentation I of an appropriate size and configuration to match with an angled side of the swivel tip T. The rim R has a retaining lip RL formed by a cut-away segment in this open end OE. As best shown in FIG. 4B, the cut-away segment has a substantially flat portion FP that bears against the annular edge 6*e* of the metallic cylindrical wall 6*a* of the bushing 6 during removal or insertion of the bushing 6. The rim R has an outside diameter substantially equal to the outside diameter of the metallic cylindrical wall 6*a* and the length of the flat portion FP is substantially equal to the thickness of the annular edge 6*e* of the metallic cylindrical wall 6*a* of the bushing 6. The retaining lip RL has a length 1 substantially from 0.050 to 0.250 inch and a thickness t substantially from 0.050 to 0.100 inch. During use of the tool 10, the retaining lip RL abuts an inside edge of the metallic cylindrical wall 6*a* and the exterior surface of the cylindrical wall 6*a* of the bushing 6 and the exterior surface of the cylindrical sidewall SW of the pressing cup 4 are substantially flush. As shown in FIG. 4B, a mating relationship is established when the retaining lip RL of the pressing cup 4 is inserted into the exposed end of the bushing 6 upon contact and engagement. The retaining lip RL thus facilitates alignment of the pressing cup 4 with the exposed annular edge 6*e* as depicted in FIGS. 3 and 6A, and prevents the pressing cup 4 from shifting from the centerline CL.

As shown in FIGS. 1 and 4, a hole H2 in one of the legs L2 provides for attachment of a safety cable 3 to the press member 2. The cable 3 is passed through this hole H2 and wound about, and securely attached to the leg L2. The opposite end of the cable 3 has a spring clip SC of sufficient length to fit over the top of the rear-trailing arm 5 that is attached to the aperture 6*d* in the center post 6*c* of the bushing 6. Once removal of the bushing 6 is accomplished using the tool 10, the bushing 6 is kept from falling to the ground by the safety cable 3.

Method of Use

This invention also includes a method of installing a bushing in an arm of a wheel mounting and a method of removing a bushing from an arm of a wheel mounting. As illustrated in FIGS. 6A and 6B, to remove the bushing 6 fasteners (not shown) attaching the rear-trailing arm 5 to the vehicle's underbody are loosened, allowing the arm to swing down from the underbody chassis, exposing the bushing 6. As depicted in FIG. 4, once the bushing 6 is exposed, the safety cable 3 is placed over the top of the rear-trailing arm 5 and the spring clip SC is inserted through the aperture 6*d* in the bushing 6 and looped back around to be attached to a portion of the cable 3. With the safety cable 3 in place, the pressing cup 4 is fitted over the outboard side of the bushing 6 and seated on the bushing as shown in FIG. 6A. The legs L1 and L2 are fitted around the rear-trailing arm above and below the cavity 7; centering the swivel screw tip T in alignment with the indentation I in the pressing cup 4. By turning the swivel screw 1 the swivel tip T is pressed against the pressing cup 4 and pushes the bushing 6 through and out of the trailing arm as shown in FIG. 6B.

Figure 5B:
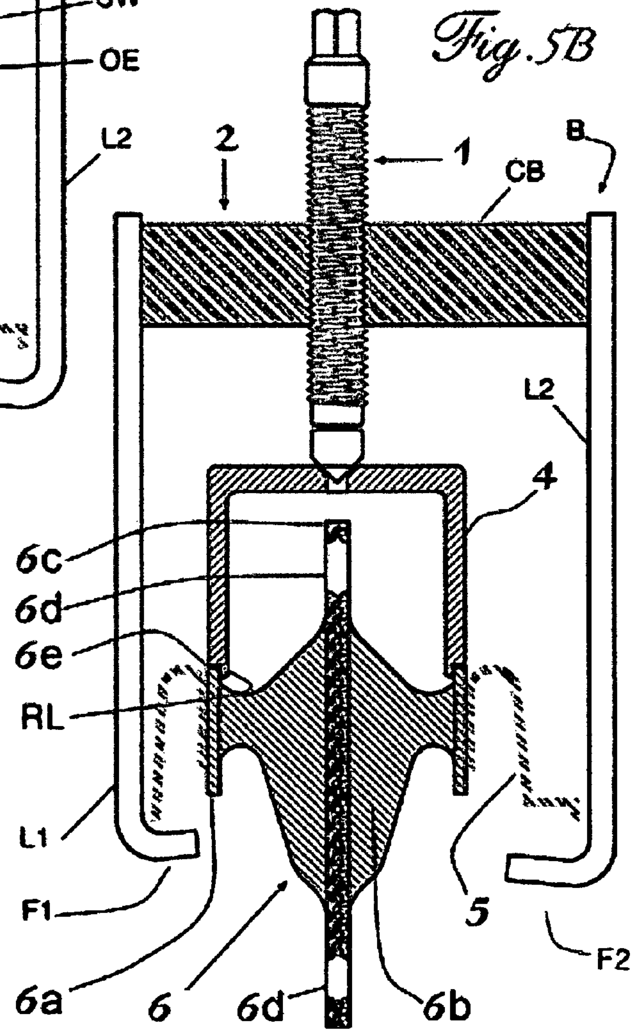
FIG. 5B is a cross-sectional view of the tool shown in FIG. 5A after its screw element has been rotated to push the bushing into the cavity in the arm of the wheel mounting.

The bushing removal and installation tool 10 is also used to press in a new bushing 6 as illustrated in FIGS. 5A and 5B into the rear-trailing arm 5. First, a new bushing 6 is placed in proper alignment and orientation on the rear-trailing arm 5 with respect to the cavity 7. Next, the pressing cup 4 is placed on the bushing 6, insuring that the outer retaining rim R of pressing cup 4 is seated in the annular edge 6*e* of the bushing. The legs L1 and L2 are positioned around the rear-trailing arm 5 above and below the rear-trailing arm bushing and the swivel screw tip T is in alignment with the indentation I. By turning the swivel screw 1 clockwise the swivel tip T presses against the pressing cup 4 and advances the bushing 6 into the cavity 7, until the bushing 6 is completely inserted as shown in FIG. 5B.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

The invention claimed is:

1. A removal and insertion tool for a bushing carried in an arm of a wheel mounting for an automotive vehicle, said bushing having an end of a predetermined configuration that is exposed when positioned at a predetermined location in the arm, said tool comprising a press member configured to grip the arm, said press member having a portion with a threaded hole therein that overlies said predetermined location when the press member grips said arm, a screw element adapted to be threaded through said hole, and a pressing cup with an outer rim having a configuration substantially identical to said end of the bushing, said press member, screw element, and pressing cup upon being assembled with the press member gripping the arm and the rim of the pressing cup bearing against said end of the bushing, the screw element is threaded through the hole and engages the pressing cup which applies a force to the end of the bushing as said screw element advances in the direction of the arm and the pressing cup has a closed end member opposed to the rim of said cup, and where the screw element includes a swivel tip adapted to engage the closed end member as the screw element advances.

2. A removal and insertion tool for a bushing carried in an arm of a wheel mounting for an automotive vehicle, said bushing having an end of a predetermined configuration that is exposed when positioned at a predetermined location in the arm, said tool comprising a press member configured to grip the arm, said press member having a portion with a threaded hole therein that overlies said predetermined location when the press member grips said arm, a screw element adapted to be threaded through said hole, and a pressing cup with an outer rim having a configuration substantially identical to said end of the bushing, said press member, screw element, and pressing cup upon being assembled with the press member gripping the arm and the rim of the pressing cup bearing against said end of the bushing, the screw element is threaded through the hole and engages the pressing cup which applies a force to the end of the bushing as said screw element advances in the direction of the arm, and the pressing cup has a closed end member opposed to the rim of said cup, and the screw element includes a swivel tip adapted to engage the closed end member as the screw element advances, and where the closed end member of the pressing cup has an indentation therein that the swivel tip engages as the screw element advances.

3. The tool of claim 2 where the pressing cup includes a side portion configured as a hollow cylinder having a predetermined diameter that is substantially equal to a diameter of a circular configured end of the bushing.

4. The tool of claim 3 where the hollow cylinder terminates at an outer end in the rim, said rim including an inner lip that abuts against an inside wall of the bushing upon the rim and end of said bushing engaging each other.

5. The tool of claim 4 where the press member has a substantially U-shaped configuration.

6. The tool of claim 5 where the press member has a pair of legs straddling the portion thereof with a threaded hole therein.

7. A removal and insertion tool for a bushing carried in an arm of a wheel mounting for an automotive vehicle, said bushing having an end of a predetermined configuration that is exposed when positioned at a predetermined location in the arm, said tool comprising a press member configured to grip the arm, said press member having a portion with a threaded hole therein that overlies said predetermined location when the press member grips said arm, a screw element adapted to be threaded through said hole, and a pressing cup with an outer rim having a configuration substantially identical to said end of the bushing, said press member, screw element, and pressing cup upon being assembled with the press member gripping the arm and the rim of the pressing cup bearing against said end of the bushing, the screw element is threaded through the hole and engages the pressing cup which applies a force to the end of the bushing as said screw element advances in the direction of the arm, where the press member has a substantially U-shaped configuration and a pair of legs straddling the portion thereof with a threaded hole therein, one arm of said pair is longer than the other leg of said pair.

8. The tool of claim 7 where the threaded hole is offset with respect to a center point of the press member portion having the threaded hole therein.

9. A removal and insertion tool for a bushing carried in an arm of a wheel mounting for an automotive vehicle, said bushing having an end of a predetermined configuration that is exposed when positioned at a predetermined location in the arm, said tool comprising a press member configured to grip the arm, said press member having a portion with a threaded hole therein that overlies said predetermined location when the press member grips said arm, a screw element adapted to be threaded through said hole, and a pressing cup with an outer rim having a configuration substantially identical to said end of the bushing, said press member, screw element, and pressing cup upon being assembled with the press member gripping the arm and the rim of the pressing cup bearing against said end of the bushing, the screw element is threaded through the hole and engages the pressing cup which applies a force to the end of the bushing as said screw element advances in the direction of the arm, and including a cable member with one end attached to the press member and another end adapted to be detachably connected to the bushing.

10. A removal and insertion tool for a cylindrically configured bushing carried in an arm of a wheel mounting for an automotive vehicle, said bushing having an end with a predetermined diameter that is exposed when positioned at a predetermined location in the arm, said tool comprising a substantially U-shaped press member including a central portion with a threaded hole therein between a pair of press member legs at opposite ends of the central portion, said press member legs being substantially parallel and extending in substantially in the same direction outwardly from the central portion and substantially at a right angle to said central portion, said press member legs each having at a terminal end thereof an inwardly pointing finger element adapted to grip the wheel mounting arm, a cylindrically configured pressing cup with an outer rim having a diameter substantially equal to the diameter of the bushing and a closed end member opposed to the rim of said cup, and a screw element adapted to be threaded through said hole, said screw element including a swivel tip adapted to engage the closed end member, said press member, screw element, and pressing cup upon being assembled with the press member legs gripping the wheel mounting arm and the rim of the pressing cup bearing against said end of the bushing, the screw element is threaded through the hole and the swivel tip engages the closed end of the pressing cup and advances in the direction of the bushing member the central portion of the of the press member is held at a constant predetermined distance away from the wheel mounting arm as the screw element advances.

* * * * *